Patented June 4, 1929.

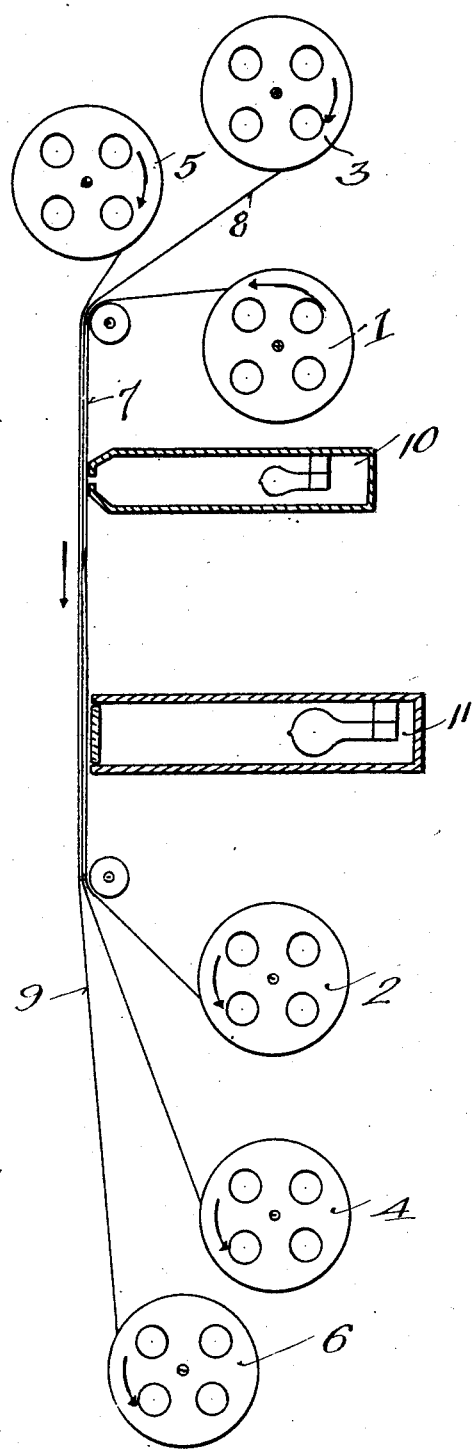

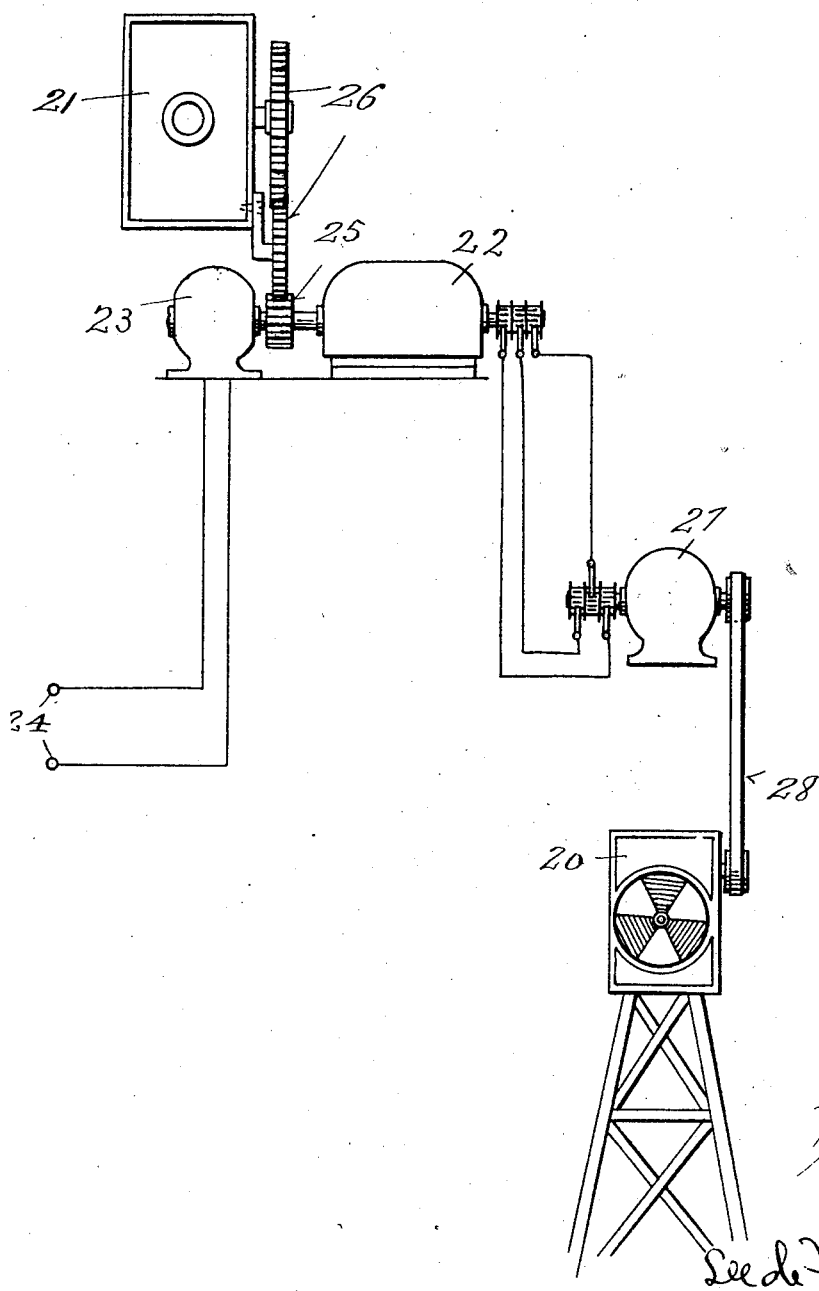

1,716,033

UNITED STATES PATENT OFFICE.

LEE DE FOREST, OF NEW YORK, N. Y., ASSIGNOR, BY MESNE ASSIGNMENTS, TO GENERAL TALKING PICTURES CORPORATION, A CORPORATION OF DELAWARE.

METHOD OF PRODUCING TALKING-MOTION-PICTURE FILMS AND APPARATUS USED THEREFOR.

Application filed June 7, 1924. Serial No. 718,643.

This invention relates to the method of producing talking motion picture film and apparatus used in connection therewith.

An object of the invention is to provide a simple, efficient and economical method of applying sound picture photography to existing motion picture film.

A further object of the invention is to provide means in connection with the method of this nature of insuring perfect synchronism of the sound and picture records in production as well as reproduction.

Further objects of the invention will appear more fully hereinafter.

The invention consists substantially in the construction, combination, location and relative arrangement of parts, as well as the method employed in producing the record film, all as will be more fully hereinafter set forth, as shown by the accompanying drawings and finally pointed out in the appended claims.

Referring to the drawings—

Fig. 1 is a diagrammatic view illustrating a printing apparatus employed in accordance with my invention.

Fig. 2 is a diagrammatic view showing one means for securing synchronism between the sound picture camera and the motion picture projector.

The same part is designated by the same reference character wherever it occurs throughout the several views.

It is among the special purposes of my present invention to provide a simple method of applying sound records to existing picture records. For example; there are many classical motion picture films which have been made at an enormous expense and to which it would be of great commercial, historical and educational value to apply sound records incident thereto, such as the spoken words, incidental music, addresses, etc. The cost of reproducing the scenic and other effects forming part of the picture record merely for the purpose of securing a sound record coincident therewith so as to produce a talking motion picture film, would be in all probability prohibitive. The value, therefore, of being able to apply the sound record to existing picture records so as to secure a complete talking motion picture record will at once be apparent.

It is to the provision of a method and apparatus for accomplishing this that the present invention is principally directed.

In accordance with my invention, I project from a motion picture projection machine the film to which it is desired to combine the sound records, and during the projection thereof secure by reading, music, etc. the incidental sounds which it is desired to record. In other words, while the motion picture projecting machine is in operation the sound picture camera is in operation. For example, assume a motion picture has been taken of some prominent personage, such as the President of the United States, delivering an address which possibly will go down in the annals of history as a masterpiece of eloquence. It would be practically impossible to obtain the voice record of the address given by means of a talking motion picture camera due to the fact that the event is past history and a repetition thereof might deviate from the historical event which it is desired to record. The motion picture projecting machine could, however, project the picture and while the picture is being projected, some one, preferably the President himself, could read the address that was made, giving the same intonation and emphasis and accentuation as given in the original address, and have this photographically recorded, in accordance with the usual photographic or phonofilm method of recording sound waves.

From the foregoing operations two films would be thus available; first, the picture film and, second, the sound record film. The next step in the procedure is to then print from the picture negative and the sound record negative on to a positive. This step of the procedure may be accomplished in any desired way, and while I have shown and will now describe, particularly with reference to Fig. 1, one arrangement for accomplishing the purpose thereof, I wish it to be understood that I do not desire to be limited or restricted in this respect, as this step of the procedure may be accomplished in many other ways.

In the arrangement shown, however, I prefer to simultaneously print from both negatives on to the positive so that, in accordance with the standard phonofilm practice, the sound and picture records will be synchronous with respect to each other and on the same film. In the arrangement shown in Fig. 1, however, I show the reel containing the negative of the sound record at 1 with its take-up reel 2. I show the reel containing the negative of the picture record at 3, with its take-up reel 4, and, finally, I show the reel of the undeveloped stock of the positive at 5, with its take-up reel 6. All of the take-up reels 2, 4 and 6 are operated at the same speed so that the sound record negative 7, the picture negative 8 and the positive undeveloped stock 9 will travel through the printing apparatus at the same speed and past the sound printing light case diagrammatically illustrated at 10 and the picture printing light case positioned thereafter in the travel of the negatives and positive diagrammatically illustrated at 11. In this way the sound printing light device 10 prints on the positive 9 the sound record contained on the sound record negative 7, and the picture printing device 11 prints on the positive 9 the picture contained on the picture negative 8.

In the talking motion picture projection machine the positive film does not at any one point appear before the sound lens or the picture lens simultaneously. In other words, the positive film passes through the sound reproducing portion or the picture reproducing portion before it passes through the other. In my preferred arrangement, I have the film pass through the sound reproducing mechanism before it passes through the picture reproducing mechanism. Thus, it will be seen that while a particular picture is being projected, the sound record on a different portion of the film is being reproduced. Therefore, to secure proper synchronization between the picture and the sound reproduction, it is necessary to allow a space between the sound record and its coincident picture record on the positive film equal to the space between the sound reproducing mechanism and the picture reproducing mechanism of a projection machine. This I accomplish in the following manner: I send the picture negative through the printing machine in advance of the sound record negative a distance equal to the distance between the reproducing mechanism on the picture projection machine. With standard makes of machines this distance will be the same. Inasmuch as it is at present proposed to employ the phonofilm or talking portion of the projection machine in the nature of an attachment to standard equipment, the advance distance of the picture negative film may be varied as desired so as to enable adjustment for all makes of projection machines.

An important feature of my present invention resides in the means taken at the time of recording the sound waves while the picture is being projected, as well as during the printing process of synchronizing, not only the speed of operation of the respective machines in the first instance and speed of travel of the negatives and positive in the second instance, but also synchronizing the footage of the respective films in the first instance and of the negatives and positive in the second instance. In other words, it is highly desirable, if not necessary, to have the films travel synchronously, foot by foot, throughout the process.

In Fig. 2 I have illustrated a simple arrangement for accomplishing the synchronous operation of a projection machine 20 and a sound recording camera 21 which have been merely diagrammatically illustrated to show the principles involved.

In this arrangement reference character 22 illustrates a simple 3-phase generator with a controlling motor 23 fed from suitable current supply mains 24. The motors 22 and 23 have their shafts connected together and to a gear 25 which, through a series of gears 26, effects at the proper speed the operation of the camera 21. The motor 27 for controlling the motion picture projector 20 through any suitable connection, such as a belt 28, secures its current from the generator 22. In this way it will be seen that perfect electrical synchronization is secured between the camera 21 and the projector 20.

Many other arrangements for accomplishing this purpose will readily occur to those skilled in the art without departing from the spirit and scope of my invention as defined in the claims, and I therefore do not desire to be limited or restricted in this respect. For example, simple synchronous motors fed from the same source of supply may be utilized as well as any other arrangement for securing synchronous operation of electrically operated devices.

Having now set forth the objects and nature of my invention and having shown and described a structure embodying the principles thereof, what I claim as new and useful and of my own invention, and desire to secure by Letters Patent is:

1. The method of producing continuous sound motion picture records which comprises projecting the picture record from a positive film and simultaneously recording the sound record on a negative film and then printing the picture negative and the sound negative on a positive film.

2. The method of producing continuous sound motion picture records which comprises projecting the picture record from a positive film and simultaneously recording the sound record on a negative film and then simultaneously printing the picture negative and the sound negative on a positive film.

3. The method of producing continuous sound motion picture records which comprises projecting the picture record from a positive film and simultaneously recording the sound record on a negative film synchronously therewith with respect to footage travel, and then printing the picture negative and the sound negative on a positive film.

4. The method of producing continuous sound motion picture records which comprises projecting the picture record from a positive film and simultaneously recording the sound record on a negative film synchronously therewith with respect to footage travel, and then simultaneously printing the picture negative and the sound negative on a positive film.

5. The method of producing continuous sound motion picture records which comprises projecting the picture record from a positive film and simultaneously recording the sound record on a negative film and then printing the picture negative and the sound negative on a positive film synchronously with respect to footage travel.

6. The method of producing continuous sound motion picture records which comprises projecting the picture record from a positive film and simultaneously recording the sound record on a negative film and then simultaneously printing the picture negative and the sound negative on a positive film synchronously with respect to footage travel.

7. The method of producing continuous sound motion picture records which comprises projecting the picture record from a positive film and simultaneously recording the sound record on a negative film synchronously therewith with respect to footage travel, and then simultaneously printing the picture negative and the sound negative on a positive film synchronously with respect to footage travel.

8. The combination of apparatus for projecting a finished positive motion picture film comprising mechanism for feeding the film; apparatus for graphically recording sound waves on a separate film and comprising film-feeding mechanism; and a driving connection leading from the first feeding mechanism to the second to produce movement of the two films in synchronism, thereby to effect the recording of sound waves on the second film simultaneously with the projection on the screen of the pictures of the first film and conformably with the action depicted by said pictures.

In testimony whereof I have hereunto set my hand on this 31st day of May A. D., 1924.

LEE DE FOREST.